US008601584B1

(12) United States Patent
Lu et al.

(10) Patent No.: US 8,601,584 B1
(45) Date of Patent: Dec. 3, 2013

(54) PROTECTION OF COMPUTERS AGAINST ARGUMENT SWITCH ATTACKS

(75) Inventors: Royce Lu, Taipei (TW); Ming-Chang Shih, Taipei (TW); Wen-Chih Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 29 days.

(21) Appl. No.: 13/239,112

(22) Filed: Sep. 21, 2011

(51) Int. Cl.
*G06F 21/22* (2006.01)
*G06F 12/14* (2006.01)
*G06F 11/30* (2006.01)
*G06F 9/44* (2006.01)

(52) U.S. Cl.
USPC ............................................ 726/24; 719/313

(58) Field of Classification Search
None
See application file for complete search history.

(56) References Cited

U.S. PATENT DOCUMENTS

| | | | |
|---|---|---|---|
| 7,472,288 B1 * | 12/2008 | Chou et al. ................ | 713/193 |
| 7,647,636 B2 * | 1/2010 | Polyakov et al. ............ | 726/24 |
| 7,698,742 B1 * | 4/2010 | Ferrie ......................... | 726/24 |
| 7,735,138 B2 * | 6/2010 | Zhao .......................... | 726/24 |
| 7,992,156 B1 * | 8/2011 | Wang .......................... | 719/328 |
| 8,099,740 B1 * | 1/2012 | Sallam ....................... | 719/331 |
| 8,341,649 B2 * | 12/2012 | Freericks et al. ........... | 719/318 |
| 2006/0271205 A1 * | 11/2006 | Abe ............................ | 700/9 |
| 2007/0289019 A1 * | 12/2007 | Lowrey ....................... | 726/24 |
| 2008/0127344 A1 * | 5/2008 | Sallam ........................ | 726/23 |
| 2009/0070878 A1 * | 3/2009 | Wang et al. ................. | 726/24 |
| 2009/0282485 A1 * | 11/2009 | Bennett ...................... | 726/24 |
| 2010/0088739 A1 * | 4/2010 | Hall et al. .................... | 726/1 |
| 2011/0093953 A1 * | 4/2011 | Kishore et al. ............. | 726/24 |
| 2011/0209219 A1 * | 8/2011 | Zeitlin et al. ............... | 726/23 |

OTHER PUBLICATIONS

Khobe—8.0 earthquake for Windows destop security software, May 5, 2010, 12 sheets [retrieved on Sep. 15, 2011], retrieved from the internet: http://www.matousec.com/info/articles/khobe-8.0-earthquake-for-windows-desktop-security-software.php.
ZwClose routine (Windows Driver Kit), 3 sheets [retrieved on Sep. 16, 2011], retrieved from the internet: http://msdn.microsoft.com/en-us/library/ff566417(d=printer).
TerminateProcess function, 4 sheets [retrieved on Sep. 16, 2011], retrieved from the internet: http://msdn.microsoft.com/en-us/library/ms686714(d=printer,v=vs.85).aspx.
The Register—New attach bypasses virtually all AV protection—Bait, switch, exploit!, 4 sheets [retrieved on Sep. 15, 2011], retrieved from the internet: http://www.theregister.co.uk/2010/05/07/argument_switch_av_bypass/.

* cited by examiner

*Primary Examiner* — Christopher Revak
(74) *Attorney, Agent, or Firm* — Okamoto & Benedicto LLP

(57) ABSTRACT

A computer is protected from argument switch attacks by intercepting a function call to terminate a process. The function call and a handle used as an argument in the function call are forwarded by an antivirus system service descriptor table to an antivirus. The antivirus is configured to evaluate the function call to determine whether or not the function call is terminating an antivirus process. A consistent handle table includes a listing of handles of processes employed as arguments in function calls that terminate processes and are approved by the antivirus. Instructions that close a handle are detected by the antivirus, which compares the handle to those in the consistent handle table. The antivirus blocks those instructions that close a handle that is included in the consistent handle table.

19 Claims, 5 Drawing Sheets

PROTECTION OF COMPUTERS AGAINST ARGUMENT SWITCH ATTACKS

BACKGROUND OF THE INVENTION

1. Field of the Invention

The present invention relates generally to computer security, and more particularly but not exclusively to methods and apparatus for protecting computers against argument switch attacks.

2. Description of the Background Art

Computer viruses, worms, Trojans, rootkits, and spyware are examples of malicious codes that have plagued computer systems throughout the world. Although there are technical differences between each type of malicious code, technology for detecting malicious codes is also generally referred to as "antivirus." Malicious codes have become so prevalent that experienced computer users have some form of antivirus in their computers. Antivirus for scanning data for malicious codes is commercially available from several vendors, including Trend Micro, Inc.

To detect malicious codes, an antivirus needs a way to intercept and evaluate potentially harmful events in the computer it is protecting. "SSDT hooking" is a popular antivirus interception technique whereby the antivirus modifies the contents of the system service descriptor table (SSDT) to redirect function calls to the antivirus. Unfortunately, SSDT hooking can be bypassed using the so-called "argument switch" attack, as described by researchers of matousec.com. In a nutshell, an argument switch attack involves changing the behavior of a function call after the function call has been deemed safe (i.e., non-malicious) by the antivirus. Argument switch attacks present a major problem because most commercially available antivirus relies on SSDT hooking. Worse, argument switch attacks are relatively easy to perpetrate given that they may be initiated even by applications running in user mode.

SUMMARY

In one embodiment, a computer-implemented method of protecting a computer against an argument switch attack includes receiving a function call to terminate a process running in the computer, the function call including a handle of the process as an argument. The function call is detected as not terminating an antivirus process. The handle of the process is added to a table of handles and the function call is allowed to execute in response to detecting that the function call is not terminating the antivirus process. An instruction to close a target handle is detected. The table of handles is consulted to detect that the target handle matches the handle of the process. In response to detecting that the target handle matches the handle of the process as indicated in the table of handles, the instruction is blocked from executing.

In one embodiment, a computer comprises a processor and a memory, the memory comprising computer-readable program codes stored non-transitory in the memory for execution by the processor, the computer-readable program codes in the memory comprise a system service descriptor table of an operating system of the computer, an antivirus system service descriptor table configured to intercept a function call to terminate a process, a consistent handle table comprising handles of processes used as arguments in function calls approved by an antivirus to execute, and an antivirus configured to evaluate the function call to determine whether or not the function call is terminating an antivirus process, to add the handle of the process to the consistent handle table when the handle of the process does not point to the antivirus process, and to block an instruction to close a handle that is included in the consistent handle table.

In one embodiment, a computer-implemented method of protecting a computer against an argument switch attack includes receiving a function call originated by an application program to terminate a process. It is determined whether or not that the function call is terminating an antivirus process. The function call is allowed to execute when the function call is not terminating the antivirus process. An instruction to close a target handle is detected. The instruction is blocked from executing when the target handle matches a handle of the process to be terminated by the function call.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of antivirus operations in a computer running the Microsoft Windows™ operating system for illustration purposes only. It is to be noted that embodiments of the present invention are equally applicable to other operating systems.

Figure 1:
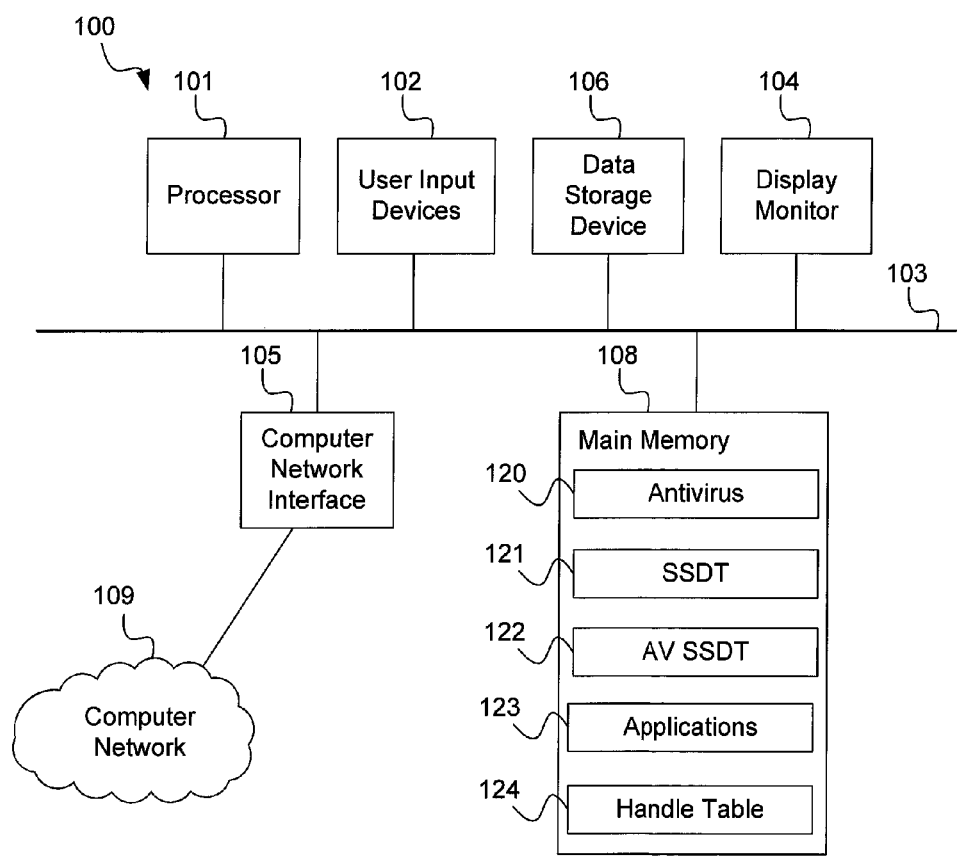
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules, which in the example of FIG. 1 includes an antivirus 120, a system service descriptor table (SSDT) 121, an antivirus SSDT 122, applications 123, and a consistent handle table 124. In the example of FIG. 1, the computer 100 runs under the Microsoft Windows™ operating system.

The software modules comprise computer-readable program codes stored non-transitory in the main memory 108 for execution or reading by the processor 101. The software modules may be loaded from the data storage device 106 to the main memory 108. The software modules may also be made available in other computer-readable medium including optical disk, flash drive, and other memory devices.

Figure 2:
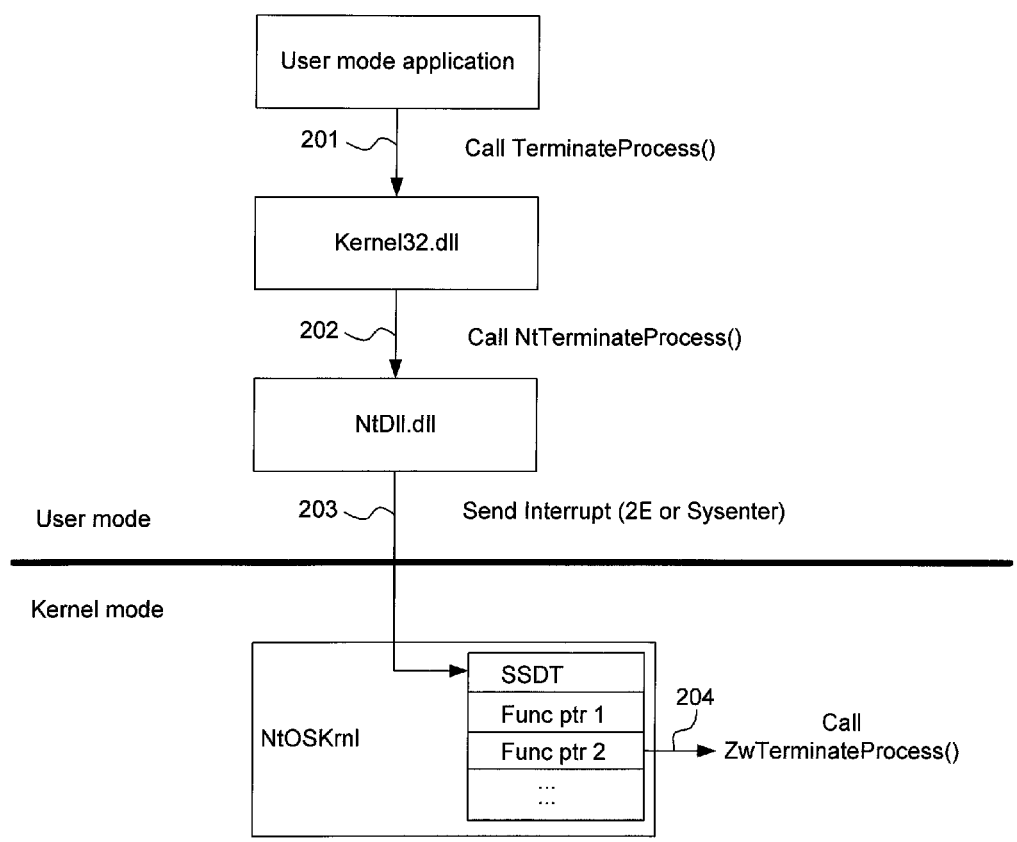
FIG. 2 is a flow diagram illustrating termination of a process in a computer that does not have an antivirus.

FIG. 2 is a flow diagram illustrating termination of a process in a computer that does not have an antivirus. A process is an instance of a computer program being executed. A process may be terminated for a variety of legitimate reasons, including when a user wants to close the corresponding program. In the example of FIG. 2, an application program running in user mode wants to terminate a target process. To do so, the application calls a terminate process function, which is the Win32 API TerminateProcess( ) function in this example (201). A function may be a subroutine, method, procedure, routine, function, or other program code that performs a specific task. The function call transfers to the Kernel32.dll and then call the NtTerminateProcess( ) function (202). The function call is then transferred to the NtDll.dll, resulting in the sending of an interrupt to kernel mode (203). The transition to kernel mode is due to the terminate process needing to remove some kernel objects. In kernel mode, the interrupt is received in the SSDT 121, which dispatches the appropriate routine, ZwTerminateProcess( ) in this example, to start the termination of the target process being terminated by the application (204).

Figure 3:
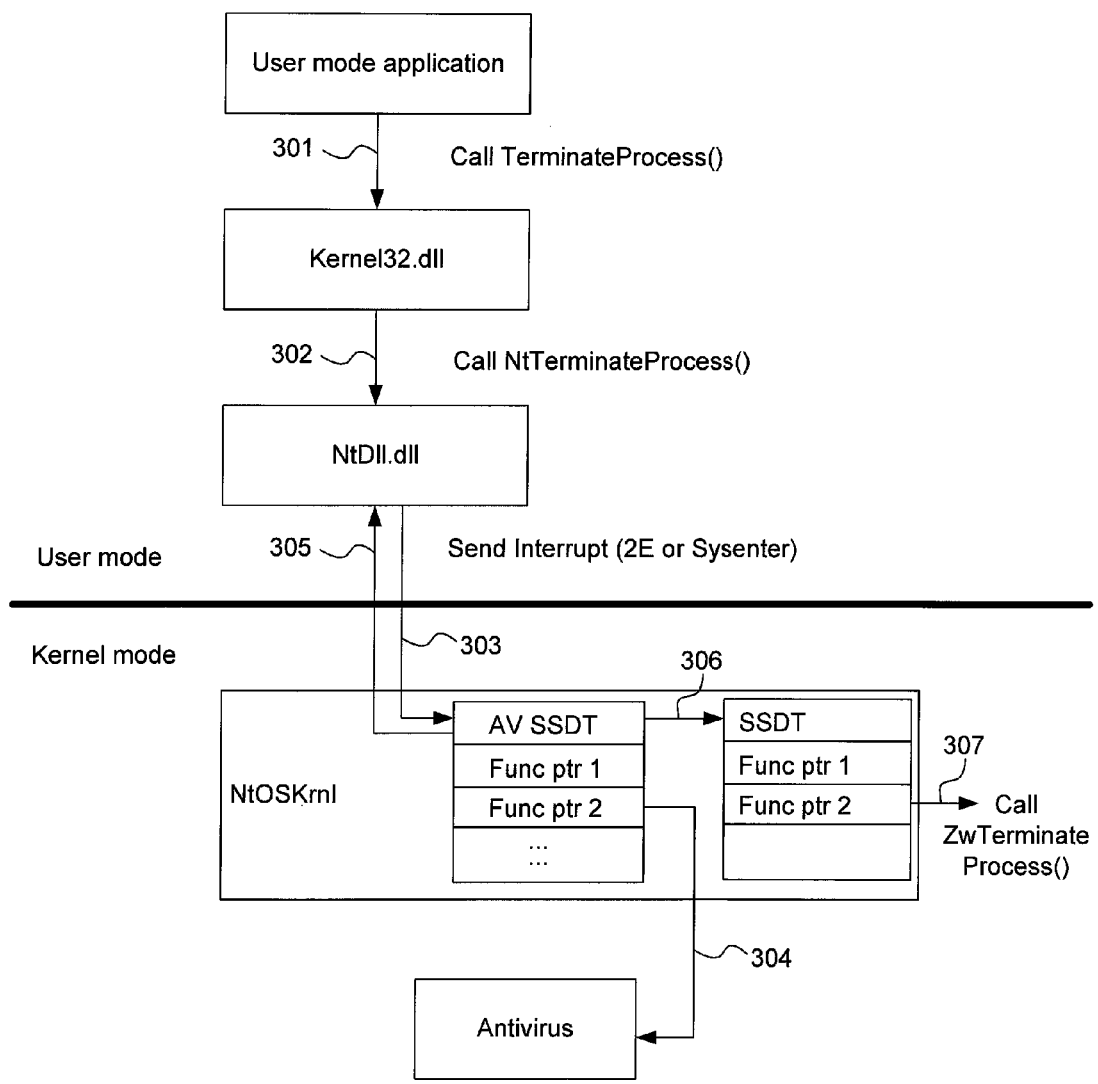
FIG. 3 is a flow diagram illustrating termination of a process in a computer with an antivirus.

FIG. 3 is a flow diagram illustrating termination of a process in a computer with an antivirus. As in FIG. 2, an application program running in user mode wants to terminate a target process by calling the Win32 API TerminateProcess( ) function (301). The function call transfers to the Kernel32.dll and then call the NtTerminateProcess( ) function (302). The function call is then transferred to the NtDll.dll, resulting in the sending of an interrupt to kernel mode (303).

In the example of FIG. 3, the antivirus includes an antivirus system service descriptor table (AV SSDT) for intercepting function calls intended to be received in the SSDT of the operating system. This is an example of SSDT hooking. In particular, the interrupt to kernel mode is received in the AV SSDT (303), which sends the function call to the antivirus by way of a function pointer (304). The antivirus evaluates the function call to determine whether the function call is safe or malicious. In particular, the antivirus checks if the function call is terminating an antivirus process. If the function call is terminating an antivirus process, the antivirus is configured to reject the function call (305), preventing the function call from being executed to completion and thus preventing termination of the antivirus process. Otherwise, if the function call is not terminating an antivirus process, the antivirus allows the function call to be forwarded to the actual SSDT, i.e., the SSDT of the operating system (306). The SSDT includes a pointer to a routine, which in this example is the ZwTerminateProcess( ), that terminates the target process (307). The ZwTerminateProcess( ) executes to terminate the target process.

The just described example illustrates the effectiveness of the SSDT hooking technique to intercept function calls so they can be evaluated by an antivirus before execution. Unfortunately, SSDT hooking can be bypassed by an argument switch attack as described with reference to FIG. 4.

Figure 4:
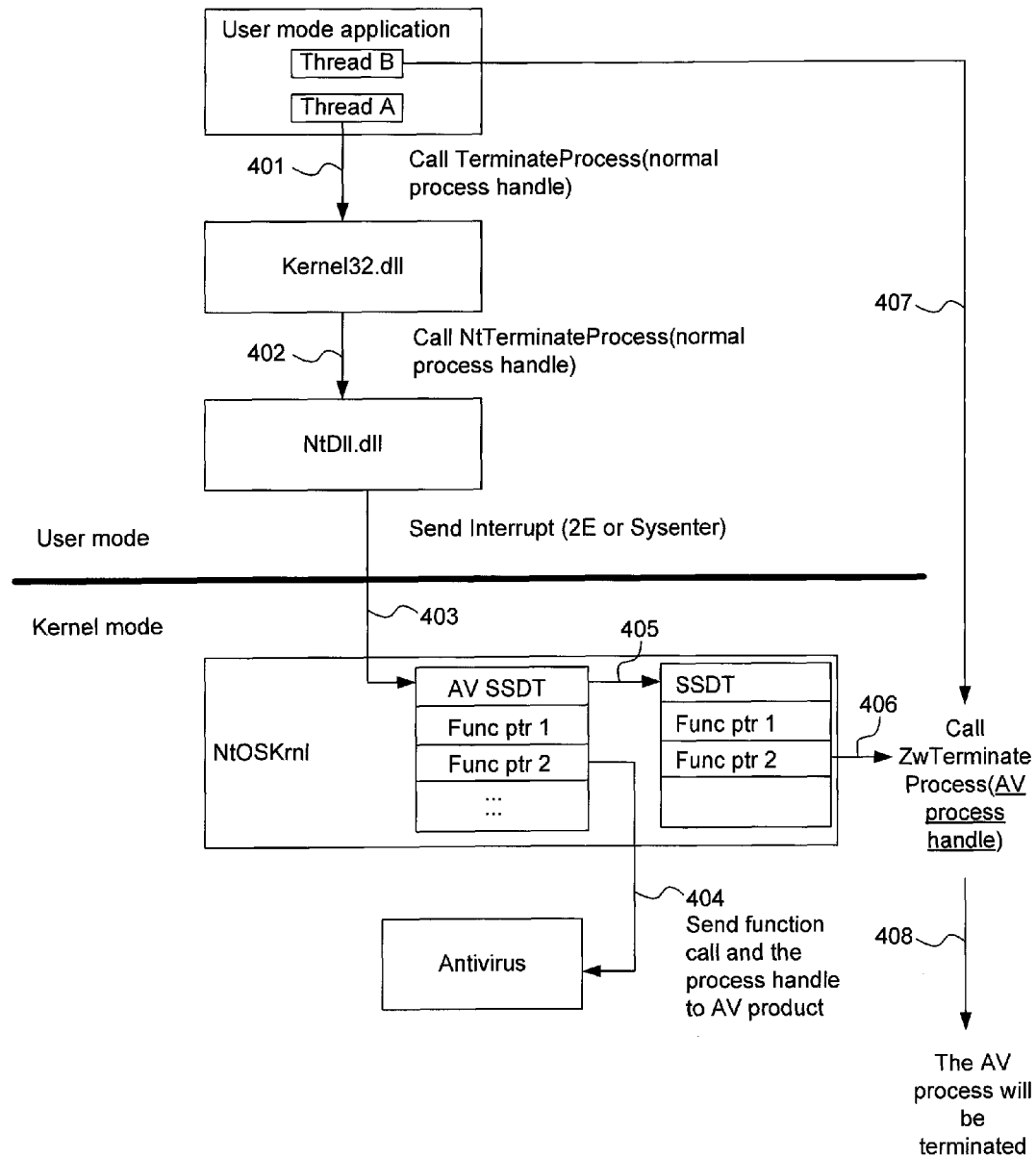
FIG. 4 is a flow diagram illustrating an argument switch attack in a computer with an antivirus.

FIG. 4 is a flow diagram illustrating an argument switch attack in a computer with an antivirus. As in FIG. 3, an application program running in user mode wants to terminate a target process by calling the Win32 API TerminateProcess( ) function (401). As is well known, a process of an application may have multiple threads. In this example, a thread A of the application calls the terminate function. The function call transfers to the Kernel32.dll and then call the NtTerminateProcess( ) function (402). The function call is then transferred to the NtDll.dll, resulting in the sending of an interrupt to kernel mode (403).

A handle is an abstraction that identifies a reference, such as a reference to an object or blocks of memory. In this example, the handle identifies an object, which is the process to be terminated. More specifically, the argument (or parameter) of the function call to terminate the target process is the handle of the target process. The AV SSDT intercepts the function call intended to be received in the SSDT of the operating system (403), evaluates the function call (404), and passes the function call to the SSDT of the operating system (405) because the function call is terminating a normal process as indicated by the handle in the argument of the function call. That is, the antivirus allows the function call to execute because it is not terminating an antivirus process.

An argument switch attack uses the concept of "race condition" in multi-threaded programming. The malicious process originating the argument switch attack executes two threads, with a first thread performing a supposedly safe function (so it can pass antivirus scrutiny) and a second thread changing the argument of the safe function after the safe function passes evaluation by the antivirus. In the example of FIG. 4, the user mode application has a malicious process that has a thread A and a thread B. Thread A calls a terminate process function using the handle of a normal process (e.g., not an antivirus process) as argument. After the terminate process function has passed evaluation of the antivirus (405) but before the terminate process function is executed (406), thread B accesses the handle used in the terminate process function as an argument and changes the object the handle is pointing to (407). In other words, thread B switches the argument (hence the name "argument switch" attack) of the function call after the function call has passed antivirus scrutiny but before completion.

In the Microsoft Windows™ operating system, each process has its own unique process handle table. When thread A initiated the terminate process function, the handle of the normal process (i.e., the target process to be terminated by thread A) is indicated in the process handle table of the user mode application program. Because thread B exists in the same process as thread A, thread B has access to the same process handle table employed by thread A. When thread B closes the handle of the normal process and opens the handle of an antivirus process, the operating system reuses the handle that formerly pointed to the normal process but now points to the antivirus process in the same process handle table. That is, in the example of FIG. 4, thread B modifies the handle used as an argument in the terminate process function to point to the antivirus process (407). This results in the antivirus process, instead of the normal process, being terminated (408). Once the antivirus process is terminated, the malicious process is free to perform malicious actions.

Figure 5:
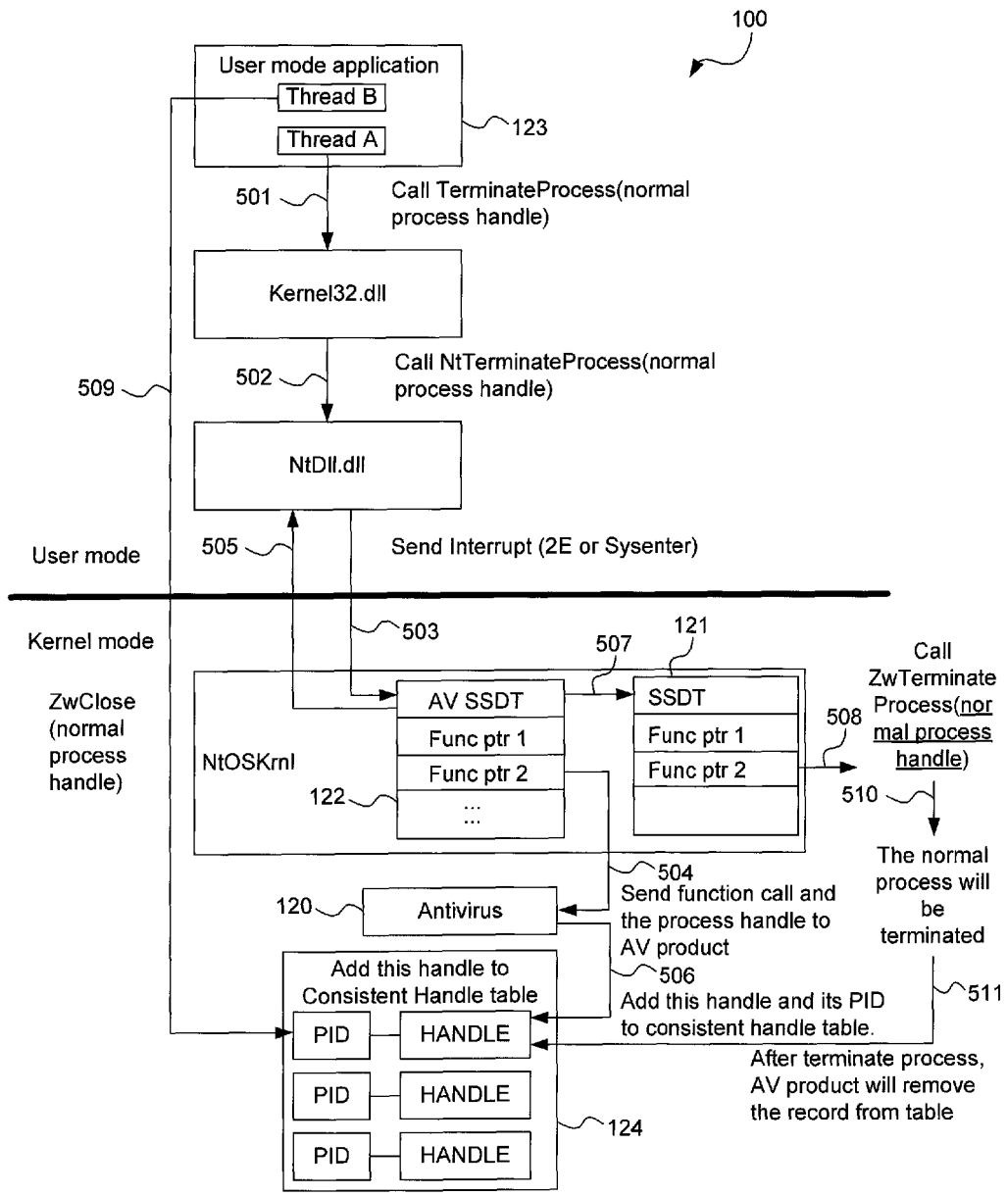
FIG. 5 is a flow diagram of a method of protecting computers against argument switch attacks in accordance with an embodiment of the present invention.

FIG. 5 is a flow diagram of a method of protecting computers against argument switch attacks in accordance with an embodiment of the present invention. The method of FIG. 5 is explained using the components of the computer 100 (see FIG. 1) as an example.

In the example of FIG. 5, an application program 123 wants to terminate a target process. The application program 123 runs in user mode and has a process with two threads, namely thread A and thread B. Thread A calls a terminate process function, which is a Win32 API TerminateProcess( ) function in this example, to terminate the target process (501). The target process to be terminated by thread A is a normal process, i.e., not an antivirus process. Thread A uses the handle of the normal process as the argument in the function call. The function call transfers to the Kernel32.dll and then call the NtTerminateProcess( ) function (502). The function call is then transferred to the NtDll.dll, resulting in the sending of an interrupt to kernel mode (503).

The antivirus 120 is configured to detect computer viruses. In the example of FIG. 5, the antivirus 120 is configured to receive a function call and the handle used as an argument in the function call, and to evaluate the function call to determine if the function call is terminating an antivirus process, i.e., a process of the antivirus 120 or other components of the antivirus 120. The antivirus 120 allows the function call to execute when the function call is not terminating an antivirus process. Otherwise, when the function call is terminating an antivirus process, the antivirus 120 blocks the function call to prevent it from executing.

In one embodiment, the antivirus 120 maintains the consistent handle table 124. The antivirus 120 is configured to add the handle and process identification (PID) of a normal process that is to be terminated by an approved function, i.e., a function that has been evaluated and allowed by the antivirus 120 to execute. The antivirus 120 removes the handle and PID from the consistent handle table 124 after the approved function has completed execution.

The antivirus 120 is further configured to detect an instruction (e.g., a function call) to close a handle, and to block the instruction when the instruction closes a handle of a normal process to be terminated by an already approved function call. In the example of FIG. 5, the antivirus 120 hooks the ZwClose routine, which is a function for closing a particular handle, to detect an attempt to close a handle included in the consistent handle table 124. Closing of a handle included in the consistent handle table 124 is typically an attempt to switch the argument of an approved function, and is thus indicative of an argument switch attack. In that case, the antivirus 120 blocks the ZwClose routine from executing. Otherwise, when the ZwClose routine is closing a handle with no corresponding entry in the consistent handle table 124, the antivirus 120 allows the ZwClose routine to execute.

The antivirus 120 employs SSDT hooking to intercept function calls. In particular, the antivirus 120 installs an antivirus SSDT 122, which intercepts the function call intended to be received in the SSDT of the operating system (503). The antivirus SSDT 122 forwards the function call and the handle of the process to be terminated by the function call to the antivirus 120. The antivirus 120 evaluates the function call to determine if the function call is safe or malicious (504). In particular, the antivirus 120 checks if the function call is terminating an antivirus process. The antivirus 120 may compare the handle in the argument of the function call against a handle of an antivirus process to determine whether or not the handle points to the antivirus process. If the function call is terminating an antivirus process (i.e., the handle points to an antivirus process), the antivirus 120 is configured to reject the function call (505), preventing the function call from being executed to completion and thus preventing termination of the antivirus process.

Otherwise, if the function call is deemed safe and is thus approved because it is not terminating an antivirus process, the antivirus 120 is configured to add the handle and PID of the process being terminated by the function call in the consistent handle table 124. The consistent handle table 124 comprises a listing of PIDs and handles of processes to be terminated by approved function calls. After adding the handle and PID of the function call to the consistent handle table 124, the antivirus 120 allows the function call to pass to the SSDT 121, which is the actual SSDT of the operating system (507). The SSDT 121 dispatches a routine, ZwTerminateProcess( ) in this example, to start termination of the process (508).

In the example of FIG. 5, the user mode application 123 is malicious and is configured to perpetrate an argument switch attack to terminate the antivirus process. Thread B of the application 123 attempts to access the handle of the approved function call and make the handle point to the antivirus process. To do so, thread B attempts to close the handle of the normal process supposed to be terminated by the approved function call by issuing a close handle function call, which in this example is the ZwClose( ) routine. The antivirus 120 intercepts the instruction to close the handle and checks the handle against handles indicated in the consistent handle table 124 (509). Because the handle is included in the consistent handle table 124, the antivirus 120 deems the instruction to be indicative of an argument switch attack. Accordingly, the antivirus 120 blocks the instruction to close the handle of the normal process to prevent the instruction from executing. Otherwise, if the instruction is closing a handle that is not in the consistent table 124, the antivirus 120 allows the instruction to proceed.

The argument of the terminate process function call is thus protected from being switched during the progress of the function call. This allows the function call to execute with the handle of the normal process as argument, resulting in the function call being executed to completion to terminate the normal process (510). The antivirus 120 removes the PID and handle of the normal process from the consistent handle table 124 after the normal process is terminated (511). The antivirus process is thus saved from being terminated, allowing the antivirus 120 to continue protecting the computer 100.

Methods and apparatus for protecting computers against argument switch attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of protecting a computer against an argument switch attack, the method comprising:

receiving a function call to terminate a process running in the computer, the function call including a handle of the process as an argument;

detecting that the function call is not terminating an antivirus process;

adding the handle of the process to a table of handles in response to detecting that the function call is not terminating the antivirus process;

allowing the function call to execute in response to detecting that the function call is not terminating the antivirus process;

detecting an instruction to close a target handle;

consulting the table of handles to detect that the target handle matches the handle of the process; and in response to detecting that the target handle matches the handle of the process as indicated in the table of handles, blocking the instruction from executing.

2. The method of claim 1 wherein the function call to terminate the process is made by a first thread of an application having the first thread and a second thread, and the second thread issues the instruction to close the target handle.

3. The method of claim 1 further comprising:
removing the handle of the process from the table of handles after the process is terminated.

4. The method of claim 1 further comprising:
adding a process identification (PID) of the process to the table of handles in response to detecting that the function call is not terminating the antivirus process.

5. The method of claim 1 further comprising:
intercepting the function call in an antivirus system service descriptor table; and
determining whether or not the function call is terminating the antivirus process before forwarding the function call to a system service descriptor table of an operating system of the computer.

6. The method of claim 1 further comprising:
intercepting the function call in an antivirus system service descriptor table; and
forwarding the function call to a system service descriptor table of an operating system of the computer in response to detecting that the function call is not terminating the antivirus process.

7. The method of claim 1 wherein detecting that the function call is not terminating the antivirus process comprises:
comparing the handle of the process included in the function call as an argument against a handle of the antivirus process.

8. A computer comprising a processor and a memory, the memory comprising computer-readable program codes stored non-transitory in the memory for execution by the processor, the computer-readable program codes in the memory comprising:
a system service descriptor table of an operating system of the computer;
an antivirus system service descriptor table configured to intercept a function call to terminate a process;
a consistent handle table comprising handles of processes used as arguments in function calls approved by an antivirus to execute; and
the antivirus configured to evaluate the function call to determine whether or not the function call is terminating an antivirus process, to add the handle of the process to the consistent handle table when the handle of the process does not point to the antivirus process, and to block an instruction to close a handle that is included in the consistent handle table.

9. The computer of claim 8 wherein the antivirus is configured to block the function call when the handle of the process points to the antivirus process.

10. The computer of claim 8 wherein the antivirus is configured to remove the handle of the process from the consistent handle table when the function call is not terminating the antivirus process and after the process has been terminated.

11. The computer of claim 8 wherein the antivirus is configured to evaluate the function call as originated by a first thread of an application running in user mode and to block the instruction originated by a second thread of the application.

12. The computer of claim 8 wherein the antivirus receives the function call by way of the antivirus system service descriptor table.

13. A computer-implemented method of protecting a computer against an argument switch attack, the method comprising:
receiving a function call originated by an application program to terminate a process;
determining whether or not the function call is terminating an antivirus process;
allowing the function call to execute when the function call is not terminating the antivirus process;
adding the handle of the process to a table of handles in response to detecting that the function call is not terminating the antivirus process;
detecting an instruction to close a target handle; and
blocking the instruction from executing when the target handle matches a handle of the process to be terminated by the function call.

14. The method of claim 13 further comprising:
blocking the function call from executing when the function call is terminating the antivirus process.

15. The method of claim 14 further comprising:
detecting that the function call is terminating the antivirus process when the handle of the process matches a handle of the antivirus process.

16. The method of claim 13 further comprising:
removing the handle of the process from the table of handles after the process is terminated.

17. The method of claim 13 further comprising adding a process identification (PID) of the process to the table of handles in response to detecting that the function call is not terminating the antivirus process.

18. The method of claim 13 wherein the function call to terminate the process is made by a first thread of the application program, and the instruction to close the target handle is originated by a second thread of the application program.

19. The method of claim 13 further comprising:
intercepting the function call in an antivirus system service descriptor table; and
determining whether or not the function call is terminating the antivirus process before forwarding the function call to a system service descriptor table of an operating system of the computer.

* * * * *